United States Patent [19]
Yatsu et al.

[11] Patent Number: 5,842,283
[45] Date of Patent: Dec. 1, 1998

[54] POSITION DETECTION APPARATUS ALONG WITH A TRACK RAIL UNIT AND GUIDE UNIT ON WHICH IT IS EQUIPPED

[75] Inventors: Takashi Yatsu; Kouji Obara; Takaaki Hagiya, all of Kanagawa, Japan

[73] Assignee: Nippon Thompson Co., Ltd., Tokyo, Japan

[21] Appl. No.: 692,469

[22] Filed: Aug. 6, 1996

[30] Foreign Application Priority Data

Aug. 11, 1995 [JP] Japan .................................. 7-227351

[51] Int. Cl.$^6$ ...................................................... G01B 7/02
[52] U.S. Cl. .................. 33/706; 33/708; 33/484
[58] Field of Search ................. 33/706, 708, 707, 33/484, 485, 758, 483, 489

[56] References Cited

U.S. PATENT DOCUMENTS

| | | | |
|---|---|---|---|
| 3,816,002 | 6/1974 | Wieg | 33/707 |
| 4,060,903 | 12/1977 | Ernst | 33/706 |
| 4,505,046 | 3/1985 | Shonka | 33/485 |
| 4,593,471 | 6/1986 | Nelle | 33/706 |
| 4,776,098 | 10/1988 | Nelle | 33/706 |
| 5,488,782 | 2/1996 | Ochiai | 33/706 |

FOREIGN PATENT DOCUMENTS

HEI. 3153915  7/1991  Japan .

*Primary Examiner*—Christopher W. Fulton
*Attorney, Agent, or Firm*—Sughrue, Mion, Zinn, Macpeak & Seas, PLLC

[57] ABSTRACT

A position detection apparatus having a scale with resilient engaging portions that attach to a lower surface of the scale and engage insertion holes in a track rail into which fastening members are inserted for fixing the track rail to a bed. Also, a track rail unit that includes the position detection apparatus, and a guide unit that includes the track rail unit.

8 Claims, 20 Drawing Sheets

POSITION DETECTION APPARATUS ALONG WITH A TRACK RAIL UNIT AND GUIDE UNIT ON WHICH IT IS EQUIPPED

BACKGROUND OF THE INVENTION

1. Field of the Invention

The present invention relates to a guide unit equipped on a movement mechanism such as a machine tool that guides an object to be moved with high accuracy, and more particularly, to a guide unit having a position detection apparatus that detects the relative position of a track rail and slider on which it is equipped.

In addition, the present invention relates to a track rail unit composed of the combination of the above-mentioned track rail and position detection apparatus, and moreover, to said position detection apparatus itself.

2. Description of the Prior Art

An example of this type of guide unit of the prior art is the linear motion rolling guide unit shown in FIG. 1. This linear motion rolling guide unit is disclosed in Japanese Patent Laid-Open Publication No. 3-153915.

As shown in the drawing, said linear motion rolling guide unit has track rail 1 in which tracks in the form of upper transfer surfaces 1a and lower transfer surfaces 1b are formed in the lengthwise direction in the left and right shoulders, slider 3 having four rolling element circulating paths 2 respectively corresponding to these upper transfer surfaces 1a and lower transfer surfaces 1b, which is able to move relative to said track rail 1, and rolling elements in the form of balls 5 arranged and contained within said rolling element circulating path 2 that bear the load between track rail 1 and slider 3 by circulating while rolling over the above-mentioned upper transfer surfaces 1a and lower transfer surfaces 1b accompanying movement of slider 3.

Mounting groove 1d is formed over the entire length in the top of the above-mentioned track rail 1, and scale 7 is placed within and adhered to said mounting groove 1d. A magnetic pattern (not shown) of a predetermined period is recorded in this scale 7 along its lengthwise direction.

On the other hand, detection heads in the form of magnetic heads 8 are formed in the above-mentioned slider 3 to oppose the above-mentioned scale 7 separated by a predetermined gap. Said magnetic heads 8 emit a signal current according to changes in a magnetic field.

A position detection apparatus that detects the relative position of the above-mentioned track rail 1 and slider 3 is composed by the above-mentioned scale 7 and magnetic heads 8. Namely, when magnetic heads 8 move over scale 7 with slider 3, a pulse signal corresponding to the distance moved is obtained from magnetic heads 8, and the relative position of scale 7 and magnetic heads 8, namely the relative position of track rail 1 and slider 3, are detected from the number of counts of this pulse signal.

In the above-mentioned linear motion rolling guide unit, mounting groove 1d is formed in and adhered to said track rail 1 in order to attach the above-mentioned scale 7 to track rail 1.

In addition, in another example of the prior art not shown, a scale fit into a mounting groove of a track rail is fastened with bolts to said track rail.

The above-mentioned constitution, however, suffers from the following problems.

Namely, with respect to attaching the scale, since a constitution is employed wherein a long mounting groove is formed in the track rail itself and adhesive or bolts are used, the number of processing steps and assembly steps is increased, and the scale of the processing work becomes larger resulting in increased costs. In particular, in the case of a constitution in which the scale is fixed with bolts, threaded holes must be provided in the corresponding track rail, and it is extremely difficult to form said threaded holes later if the track rail is made from a hardened material.

In addition, in the case of attaching the scale with adhesive, there is the risk of the scale coming off easily as a result of changes in the adhesive over time.

Moreover, in the event it becomes necessary to replace the above-mentioned scale such as when it has become damaged for some reason, the scale must be removed in opposition to the adhesive force or removed by loosening the bolts, and a new scale must be attached using nearly the reverse procedure. Thus, a considerable number of man-hours and time are also required for replacing the scale, and the work is troublesome for the worker performing said replacement.

In addition, since the above-mentioned track rail and scale mutually engage, they cannot be treated individually as products. Thus, it is difficult to install only the scale on a different type of track rail in which a mounting groove for engaging a scale is not formed.

SUMMARY OF THE INVENTION

In consideration of the above-mentioned problems of the prior art, an object of the present invention is to provide a position detection apparatus that, together with contributing to reduced costs by reducing the number of processing steps and assembly steps of the overall guide unit, enables the mounted state of the scale to the track rail to be preserved semi-permanently provided it is not removed forcibly, enables the scale to be attached and removed easily with respect to the track rail, and enables the scale to be attached to various types of track rails that have already been installed on a machine tool and so forth, while also offering other advantages.

In addition, an object of the present invention is to provide a track rail unit composing the combination of said position detection apparatus and track rail, and moreover, to provide the above-mentioned guide unit containing a track rail unit.

In order to achieve the above-mentioned objectives, the position detection apparatus according to the present invention is equipped with a scale and a detection head; wherein, said scale is composed of a scale body in the form of a thin plate that extends along the lengthwise direction of a track rail, and engaging portions that attach said scale body to said track rail by engaging with insertion holes formed in said track trail into which fastening members are inserted.

In addition, in order to achieve the same objectives, the track rail unit according to the present invention has a track rail in which tracks are formed in the lengthwise direction, a slider able to move relative to said track rail, and a position detection apparatus equipped with a scale and a detection head; wherein, said scale is composed of a scale body in the form of a thin plate that extends along the lengthwise direction of a track rail, and engaging portions that attach said scale body to said track rail by engaging with insertion holes formed in said track trail into which fastening members are inserted.

In addition, in order to achieve the same objectives, the guide unit according to the present invention has a track rail in which tracks are formed along the lengthwise direction, a slider able to move relative to said track rail, and a position detection apparatus 4 equipped with a scale and a detection head that detects the relative position of said track rail and said slider; wherein, said scale is composed of a scale body in the form of a thin plate that extends along the lengthwise direction of a track rail, and engaging portions that attach said scale body to said track rail by engaging with insertion holes formed in said track trail into which fastening members are inserted.

In the above-mentioned position detection apparatus, track rail unit and guide unit, the scale body is attached to the track rail by engaging the above-mentioned engaging portions in fastening member insertion holes formed in the track rail.

DESCRIPTION OF THE PREFERRED EMBODIMENTS

The present invention is carried out in, for example, a linear motion rolling guide unit equipped with a position detection apparatus that detects the relative position of a track rail and slider, in order to simplify the constitution for the attachment of a scale that is a constituent feature of said position detection apparatus.

Next, the following provides an explanation of the embodiments of the present invention while referring to the attached drawings.

Figure 1:
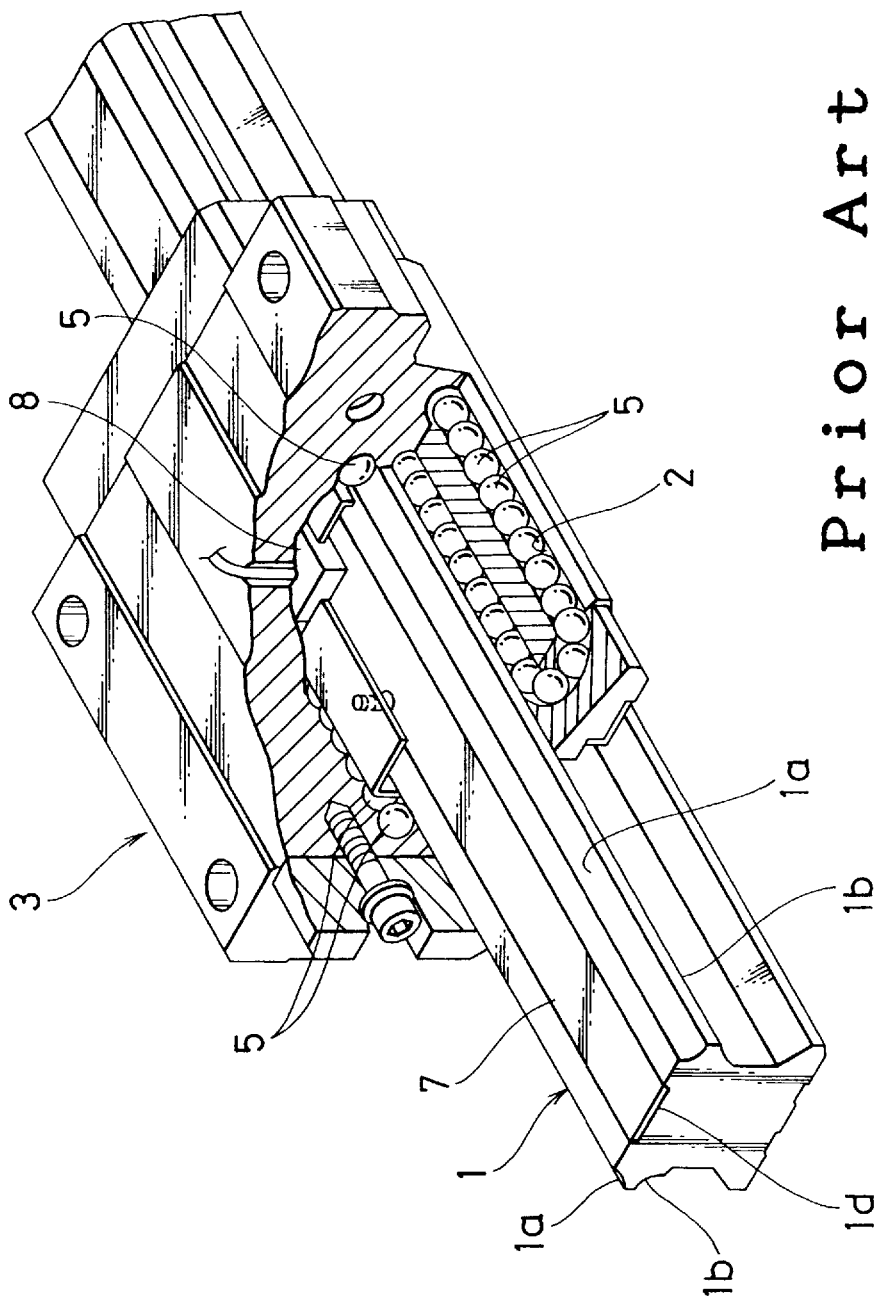
FIG. 1 is a perspective drawing, including a partial cross-section, of the essential portion of a linear motion rolling guide unit of the prior art.
Figure 2:
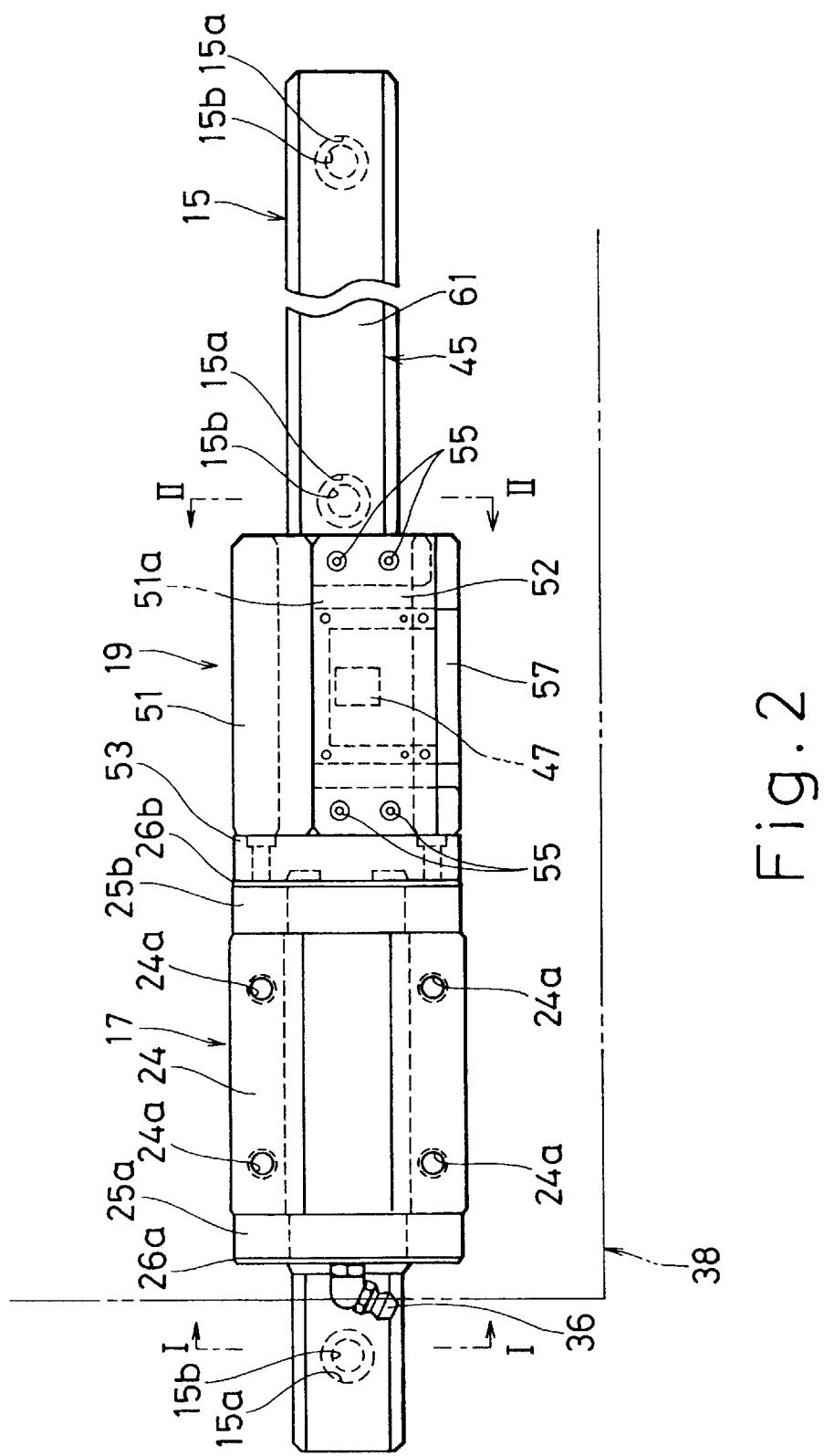
FIG. 2 is an over head view of a linear motion rolling guide unit as a first embodiment of the present invention.
Figure 3:
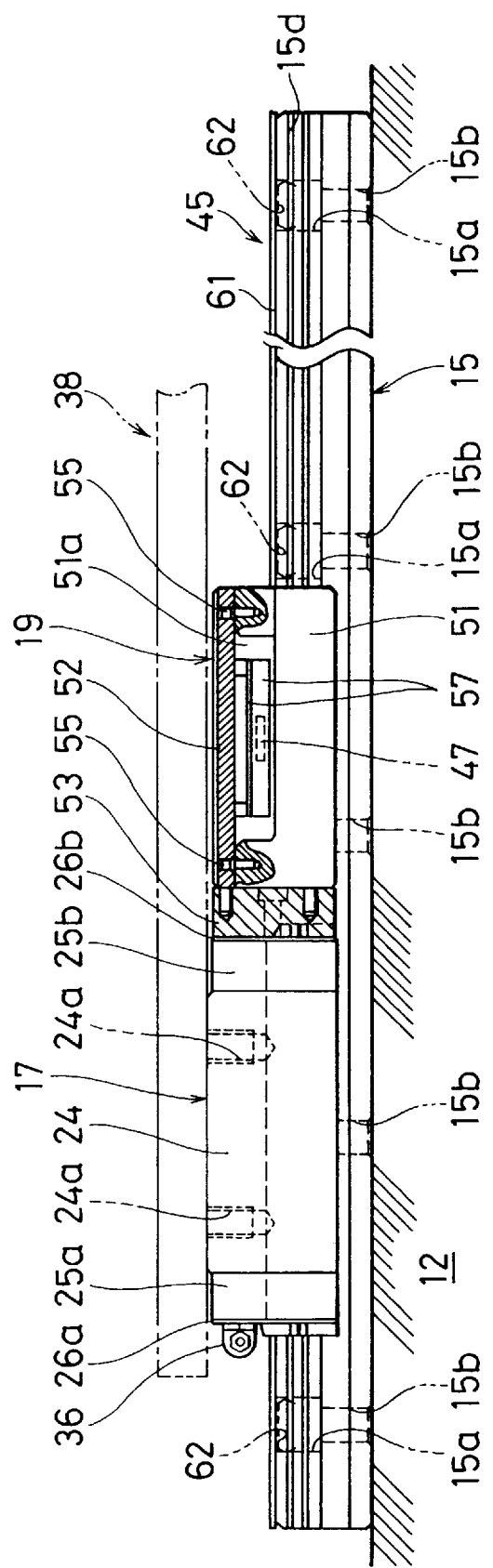
FIG. 3 is a side view, including a partial cross-section, of the linear motion rolling guide unit shown in FIG. 2.

FIGS. 2 and 3 show a guide unit of a first embodiment of the present invention, and in this case, a linear motion rolling guide unit (containing a position detection apparatus).

As shown in the drawings, this linear motion rolling guide unit has a track rail in the form of track rail 15 that is fixed on bed 12 (see FIG. 3) equipped on, for example, a machine tool (entirety not shown), a slider in the form of slide unit 17 able to move relative to said track rail 15, and sensor unit 19 coupled to one end of said slide unit 17 that moves with said slide unit 17.

The above-mentioned track rail 15 is fastened to the above-mentioned bed 12 by bolts (with hexagon sockets) 21 shown in FIGS. 4 through 6, 8 and 9. More specifically, as shown in FIGS. 2 and 3, insertion holes, consisting of countersunk portions 15a and holes 15b into which are respectively inserted heads 21a (see FIGS. 6 and 9) and threaded portions of said bolts 21, are formed at equal intervals in the lengthwise direction in track rail 15, and bolts 21 are screwed into bed 12 by being inserted into said insertion holes so that their entirety is embedded in said insertion holes.

As shown in FIGS. 3 through 9, tracks in the form of track grooves 15d are formed along the lengthwise direction in the left and right shoulders of track rail 15.

As shown in FIGS. 2, 3, 4, 6 and 7, the above-mentioned slide unit 17 has casing 24 straddled over track rail 15, a pair of end caps 25a and 25b that are coupled both ends in the direction of advance of said casing 24, and seals 26a and 26b attached to each outer surface of both said end caps 25a and 25b.

Figure 4:
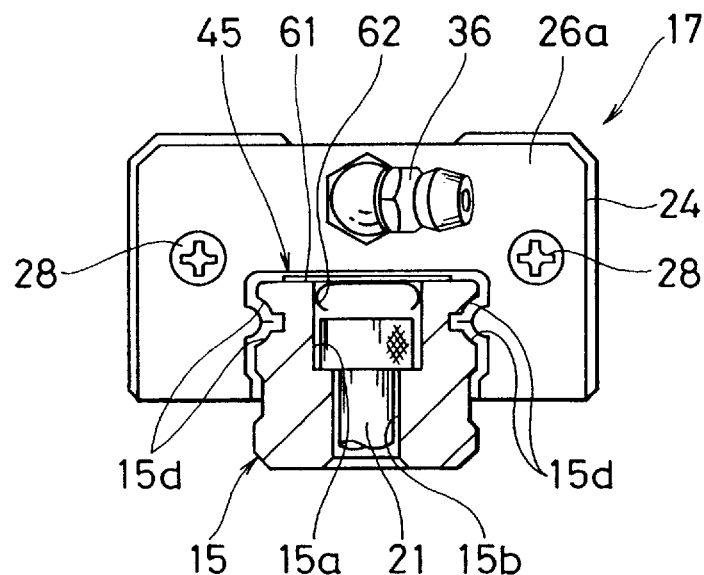
FIG. 4 is a view taken along arrows I—I relating to FIG. 2.
Figure 6:
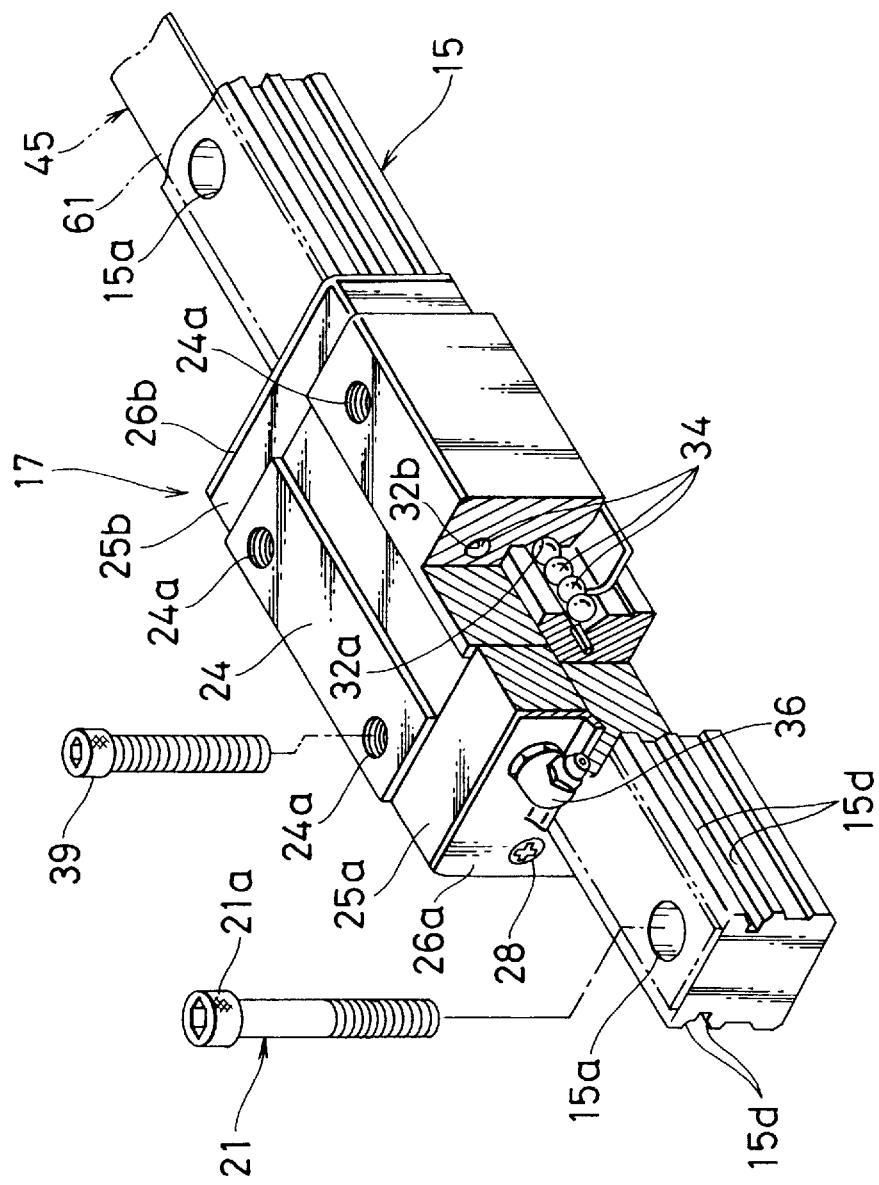
FIG. 6 is a perspective view, including a partial cross-section, of a portion of the linear motion rolling guide unit shown in FIGS. 2 and 3.

Furthermore, the screws indicated with reference numeral 28 in FIGS. 4 and 6 fasten each of the above-mentioned end caps 25a and 25b as well as each of the above-mentioned seals 26a and 26b to casing 24.

Figure 7:
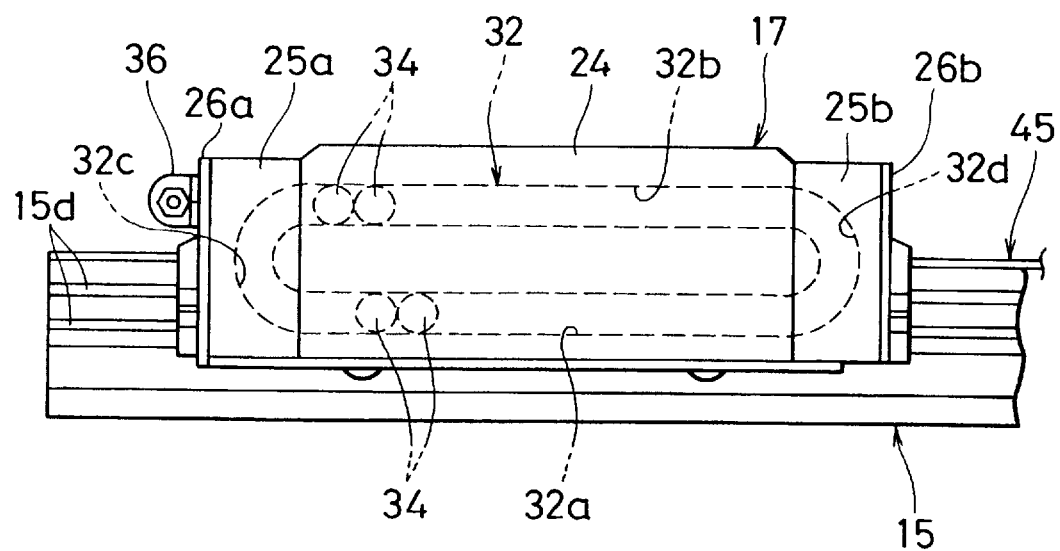
FIG. 7 is a side view of the constitution shown in FIG. 6.
Figure 8:
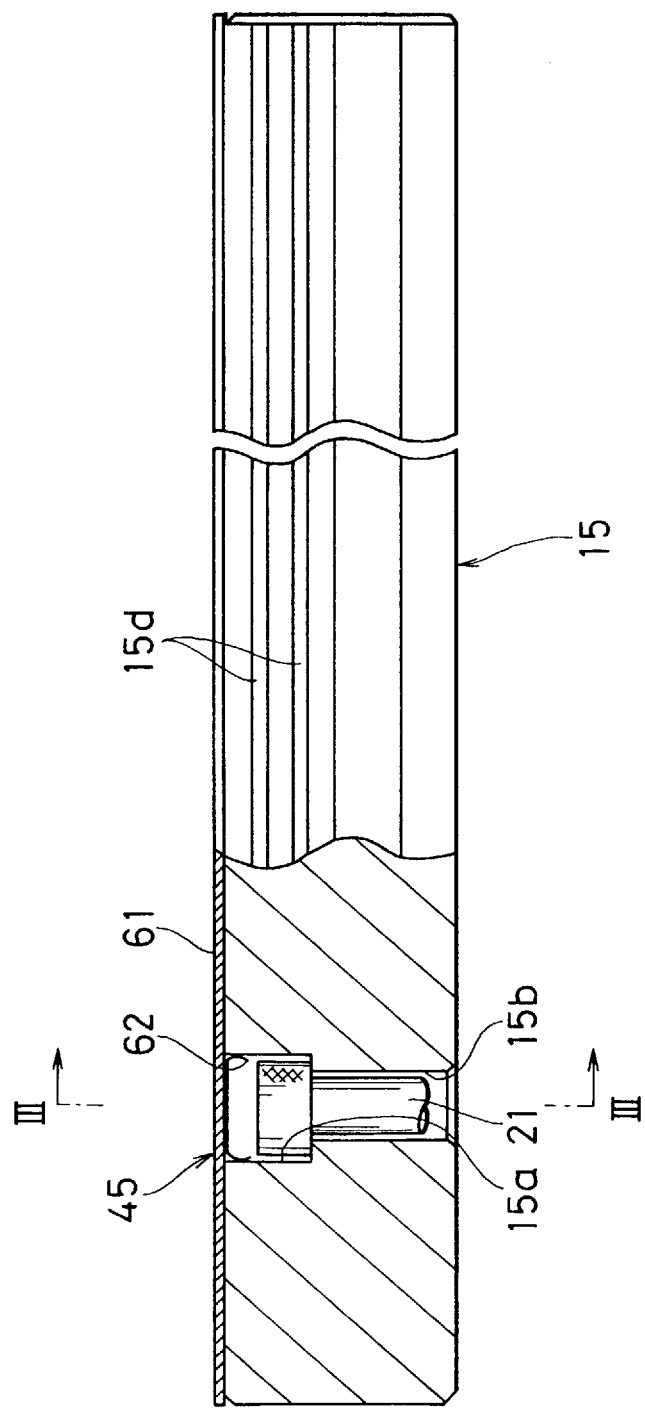
FIG. 8 is a side view, including a partial cross-section, of a track rail unit equipped on the linear motion rolling guide unit shown in FIGS. 2 and 3.

As shown in FIG. 7, rolling element circulating path 32 is formed in slide unit 17 that corresponds to track grooves 15d formed in track rail 15. A large number of rolling elements in the form of balls 34 are arranged and contained within said rolling element circulating path 32. These balls 34 bear the load between track rail 15 and slide unit 17 by circulating while rolling along the above-mentioned track grooves 15d accompanying movement of slide unit 17.

In FIG. 7, the above-mentioned rolling element circulating path 32 composed of load bearing track groove 32a and return path 32b formed mutually in parallel in the above-mentioned casing 24, and a pair of roughly semicircular direction changing paths 32c and 32d formed in both of the above-mentioned end caps 25a and 25b that connect said load bearing track groove 32a and return path 32b at both their ends. Then, said load bearing track groove 32a correspond to track groove 15d of track rail 15. The above-mentioned load bearing track groove 32a, return path 32b and balls 34 are also shown in FIG. 6.

Furthermore, as shown in FIGS. 2 through 4, 6 and 7, grease nipple 36 for supplying grease to the above-mentioned balls 34 is attached to one end cap 25a of slide unit 17.

As shown in FIGS. 2 and 3, table 38 is installed on slide unit 17 having the constitution as described above. More specifically, as shown in FIGS. 2, 3 and 6, for example, four threaded holes 24a are formed in the upper surface of casing 24 of slide unit 17, and the above-mentioned table 38 is fastened to said casing 24 by bolts 39 (with hexagon sockets: shown in FIG. 6) that screw into these threaded holes 24a.

In said linear motion rolling guide unit, the position detection apparatus that detects the relative position of the above-mentioned track rail 15 and slide unit 17 is provided having the following constitution.

Namely, said position detection apparatus has scale 45 provided on the above-mentioned track rail 15, and detection head 47 provided on sensor unit 19. This position detection apparatus and a track rail in the form of track rail 15 are generically referred to as a track rail unit.

The following provides an explanation of sensor unit 19 equipped with the above-mentioned detection head 47.

Figure 5:
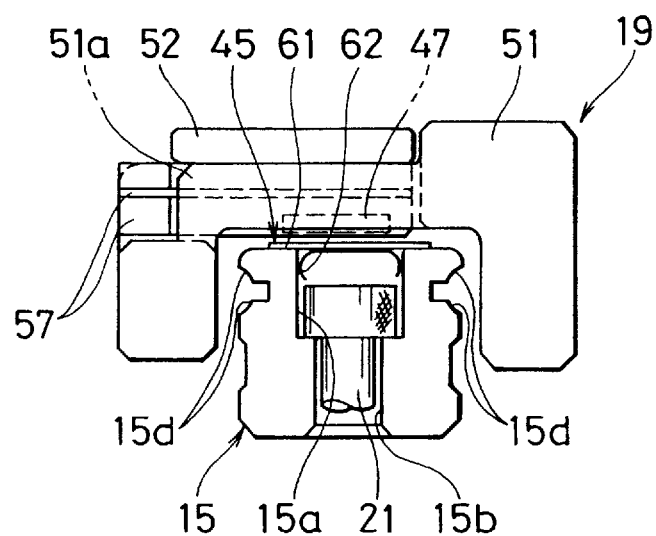
FIG. 5 is a view taken along arrows II—II relating to FIG. 2.

As shown in FIGS. 2, 3 and 5, said sensor unit 19 has roughly rectangular base portion 51 having internal space 51a that opens upward and to one side, plate 52 that is fastened to said base portion 51 so as to cover said upper open portion, and spacer 53 that is juxtapositioned between said base portion 51 and the above-mentioned slide unit 17. The width dimension and height dimension of said entire sensor unit 19 are set to be roughly equal to the dimensions of width and height of slide unit 17.

The above-mentioned spacer 53 is fastened to end cap 25b of slide unit 17 by bolts not shown, and base portion 51 is fastened to said spacer by bolts not shown. Plate 52 is fastened to base portion 51 by bolts 55 (with hexagon sockets).

Printed wiring board 57 is arranged within internal space 51a of the above-mentioned base portion 51, and fastened to the above-mentioned plate 52. The above-mentioned detection head 47 is installed on this printed wiring board 57. Detection signals emitted by detection head 47 are incorporated through an output terminal provided on this printed wiring board 57.

The following provides a detailed description of the above-mentioned scale 45 and detection head 47.

Scale 45 is composed in the manner described below.

As shown in FIGS. 2 through 9, and particularly FIGS. 3 through 5, 8 and 9, scale 45 is composed of scale body 61 in the shape of a long rectangular thin plate that extends along the lengthwise direction of track rail 15, and engaging portions 62 for attaching said scale body 61 to track rail 15 that engage (engage with countersunk portions 15a) with insertion holes (composed of countersunk portions 15a and holes 15b) formed in track rail 15 into which fastening members in the form of bolts 21 are inserted. Said scale body 61 of the present embodiment has a length that extends over the entire length of track rail 15, and as is clear from FIG. 9, has width W that is larger than diameter $D_2$ of (countersunk portions 15a of) the above-mentioned insertion holes.

The following provides individual detailed descriptions of the above-mentioned scale body 61 and engaging portions 62. An explanation is also provided with respect to detection head 47.

In the case of the present embodiment, scale body 61 is a magnetic scale made of an iron-based ferromagnetic material. Since it is necessary that this scale body be given a certain degree of mechanical strength and so forth, the use of one that is excessively thin should be avoided. For example, those having a thickness of roughly 0.2 mm can be used. However, in order to realize highly precision position detection, a thickness of roughly at least 0.5 mm is preferable. Flatness of scale body 61 can be improved by performing grinding processing and so forth after installing on the top of track rail 15. Detected portions to be detected by the above-mentioned detection head 47 are provided along the lengthwise direction of said scale body 61, and said detected portions are formed by magnetizing the upper surface layer of said scale body 61 in the manner described below. However, this magnetization may be performed over the entire width of scale body 61, and not limited to only said surface layer.

In addition, instead of magnetizing scale body 61 directly, a magnetic film may be formed on the surface of said scale body 61 followed by magnetization of this magnetic film. More specifically, said magnetic film is formed by curing, plating or sputtering and so forth after applying a magnetizing agent in the molten state. In this case, it is no longer necessary that scale body 61 be formed from an iron-based ferromagnetic material, but rather other materials such as metals and synthetic resin and so forth may also be used. However, the work of applying the above-mentioned magnetizing agent and so forth can be eliminated thereby reducing costs by forming scale body 61 itself from an iron-based ferromagnetic material and then magnetizing it directly.

Figure 10:
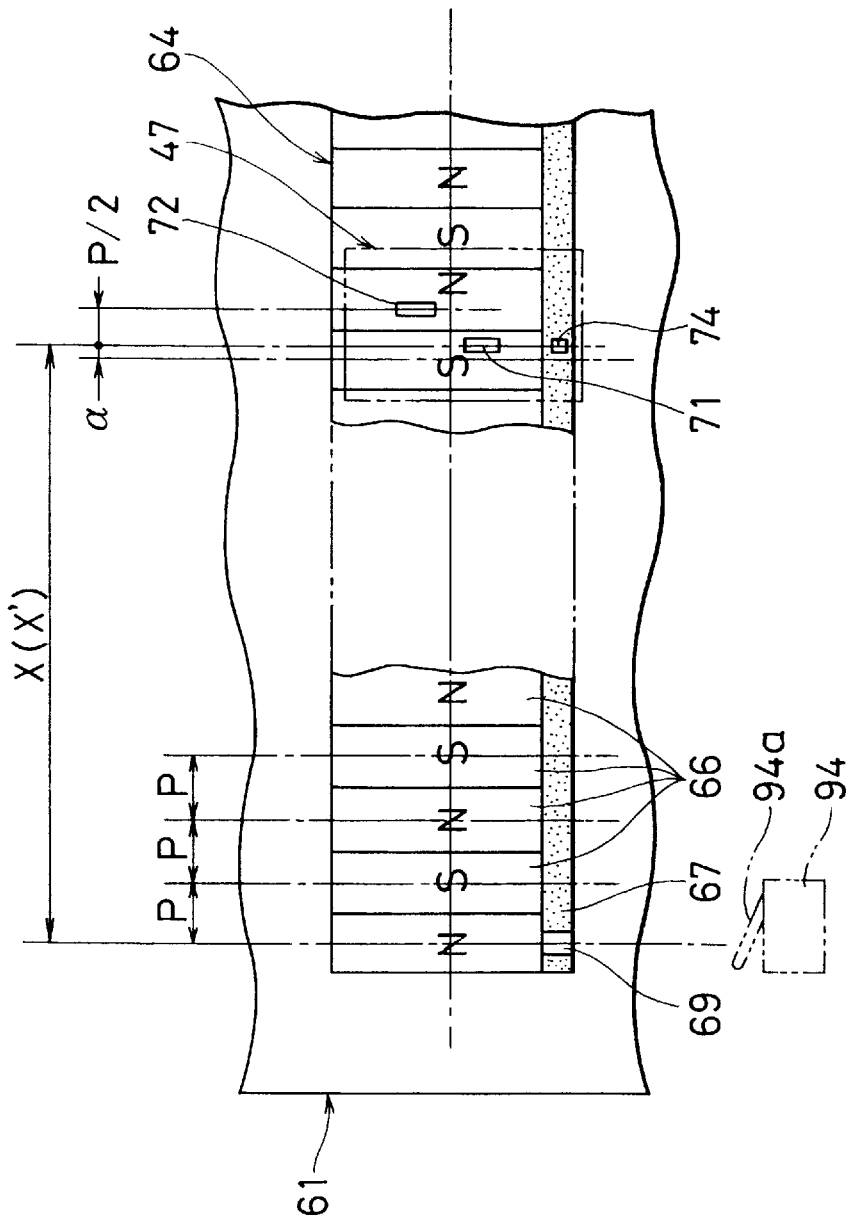
FIG. 10 is an overhead view showing a portion of a position detection apparatus equipped on the linear motion rolling guide unit shown in FIGS. 2 and 3.

As shown in FIG. 10, a large number of poles of detected portions 64 formed in the above-mentioned scale body 61 are magnetized in the lengthwise direction of said scale body 61. In this case, different N and S magnetic poles are arranged and magnetized alternately and precisely in said lengthwise direction. Each of these magnetized portions are indicated with reference numeral 66 in FIG. 10.

Furthermore, the non-magnetized portion is indicated with hatching and reference numeral 67.

In addition, an origin that serves as the measurement reference in the form of magnetized portion 69 is provided corresponding to said magnetized portion 66 located on the end.

On the other hand, as shown in FIG. 10, detection head 47, which detects the detected portions of the above-mentioned constitution, is provided with electromagnetic conversion device A 71 and electromagnetic conversion device B 72 composed of Hall effect devices and so forth for detecting each of the above-mentioned magnetized portions 66, and magnetic resistance device (MR device) 74 for detecting magnetized portion 69 serving as the origin.

The above-mentioned electromagnetic conversion device B 72 is provided shifted by ½ of pitch P between each magnetized portion 66 with respect to electromagnetic conversion device A 71. As a result, a waveform is obtained that differs in phase by π/2 from the waveform indicated with (A) in FIG. 12.

Figure 11:
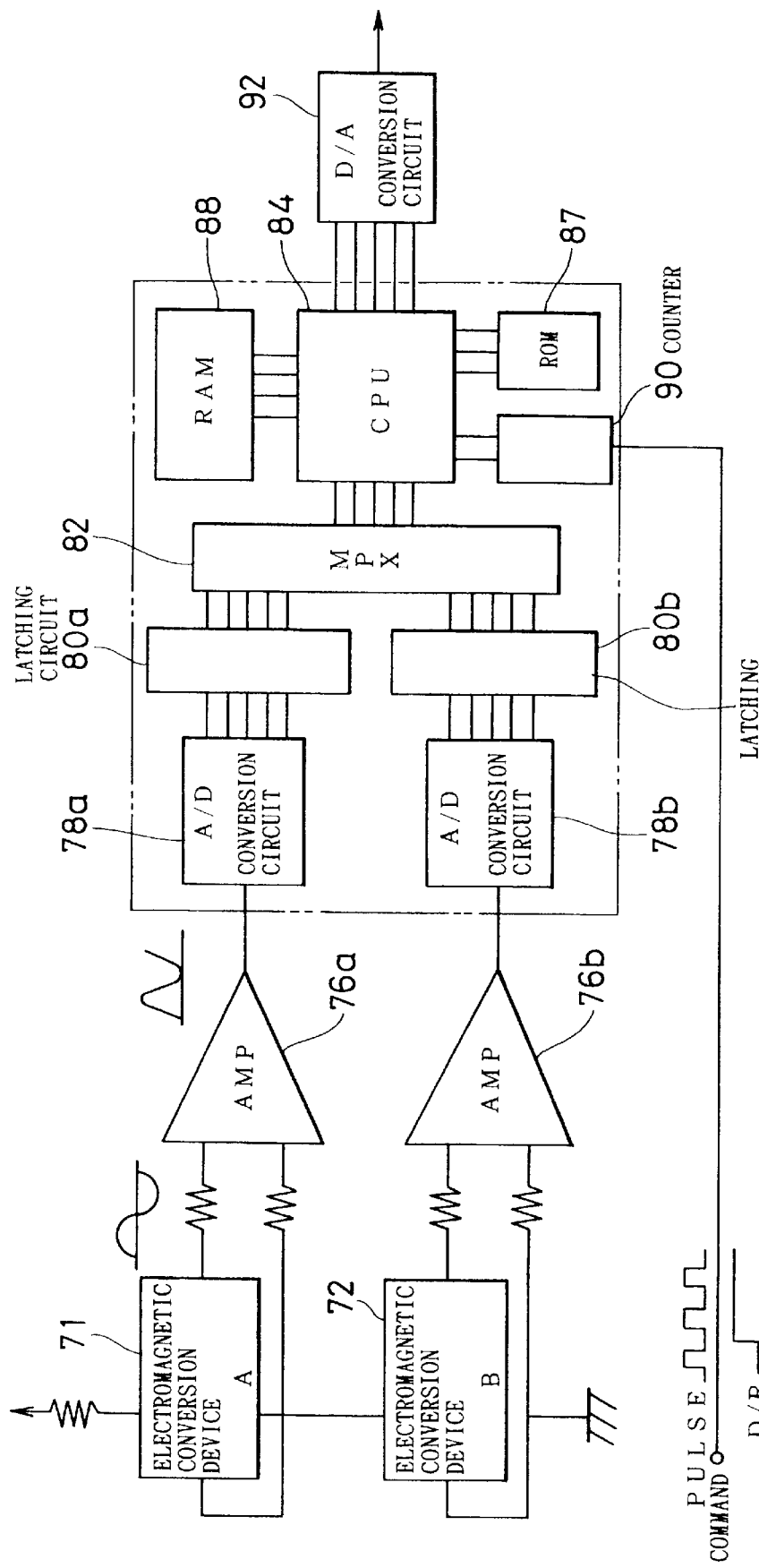
FIG. 11 is a block diagram of the control system pertaining to the position detection apparatus shown in FIG. 10.
Figure 12A:
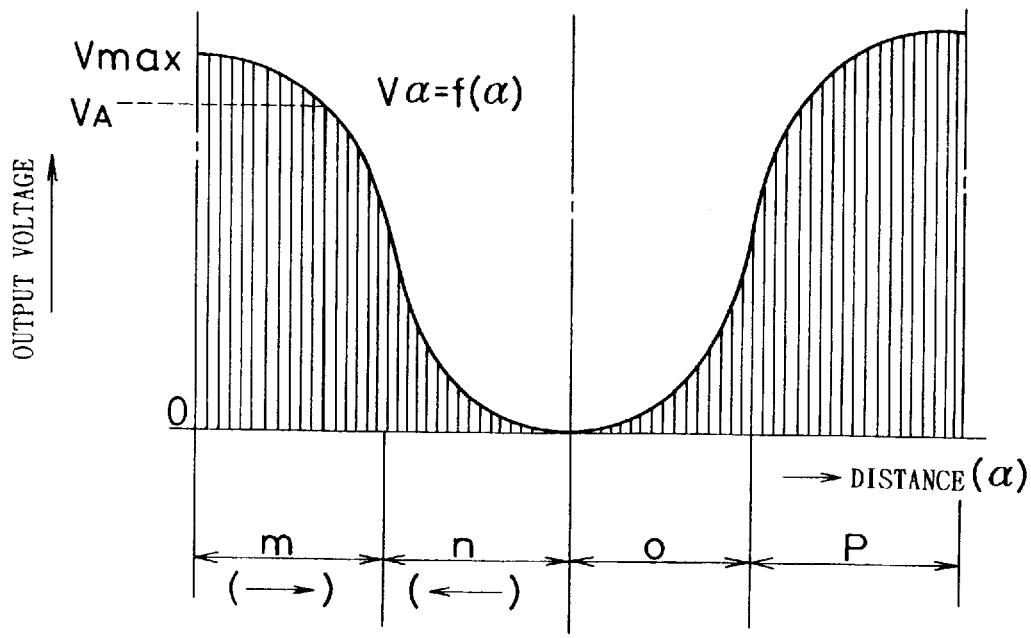
FIGS. 12(A) and 12(B) show graphs of the waveforms that are obtained from electromagnetic conversion devices contained in the position detection apparatus shown in FIG. 10.
Figure 12B:
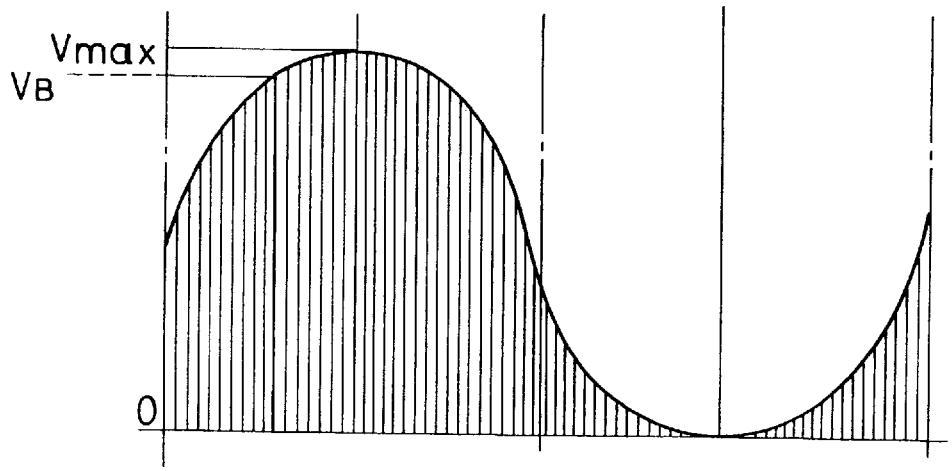

Furthermore, as shown in FIGS. 12(A) and 12(B), although a continuous positive and negative sine wave having 0 level for the baseline is obtained from electromagnetic conversion device A 71 and electromagnetic conversion device B 72, as shown in FIG. 11, amplification processing is performed so that the waveform is amplified from the 0 level to the level of Vmax as a result of passing through amplification circuits 76*a* and 76*b*. This is done to facilitate later signal processing.

Next, an explanation is provided of the constitution of the control system that performs positional control of slide unit 17, and thus table 38 (see FIGS. 2 and 3), with respect to track rail 15 based on detection signals emitted by the above-mentioned detection head 47.

As shown in FIG. 11, the constitution is such that the waveforms output from electromagnetic conversion device A 71 and electromagnetic conversion device B 72 are input to amplification circuit 76*a* and 76*b*. These amplification circuits 76*a* and 76*b* are sequentially connected to latching circuits 80*a* and 80*b* and multiplexer (MPX) 82, and the output from this multiplexer 82 is input to CPU (control circuit) 84.

In addition, memory (ROM) 87, memory (RAM) 88, a counting device in the form of up-down counter 90 and D/A conversion circuit 92 are connected to CPU 84.

The above-mentioned A/D conversion circuits 78*a* and 78*b* convert the analog waveforms amplified by amplification circuits 76*a* and 76*b* of the previous step into digital data that is respectively input to latching circuits 80*a* and 80*b*. These latching circuits 80*a* and 80*b* latch and hold the data of A/D conversion circuits 78*a* and 78*b* in order to synchronize that data continuously converted by said A/D conversion circuits 78*a* and 78*b* of the previous step. This held data is then input to multiplexer (MPX) 82. In the case of output to CPU 84 of the following step, since this multiplexer (MPX) 82 cannot output data latched by latching circuits 80*a* and 80*b* simultaneously, arithmetic processing is performed following separate output of data to CPU 84 on a time-sharing basis.

Next, an explanation is provided of the arithmetic processing of CPU 84.

First, for the initial operation, scale position data stored in the above-mentioned memory (RAM) 88 is reset corresponding to a signal emitted as a result of table 38 (see FIGS. 2 and 3) being driven and moving to the reference position and magnetic resistance device 74 shown in FIG. 10 detecting magnetized portion 69 serving as the origin. Table 38 begins to move to the desired position due to this reset command. In response to this, continuous waveforms differing in phase that are amplified as shown in FIGS. 12(A) and (B) are obtained from electromagnetic conversion device A 71 and electromagnetic conversion device B 72.

As shown in FIGS. 12(A) and (B), in looking, for example, at region m, it can be seen that the output data of electromagnetic conversion device A 71 and electromagnetic conversion device B 72 have different corresponding waveforms between FIGS. 12(A) and (B). As a result, CPU 84 is able to determine the direction of movement of table 38 by comparing this differing data.

Next, the amount of movement of table 38 is determined in the following manner.

Namely, in FIG. 10, if the amount of movement with respect to detected portion 64 of electromagnetic conversion device A 71, electromagnetic conversion device B 72 and magnetic resistance device 74 is taken to be X, this becomes the amount of movement of table 38.

As shown in FIGS. 12(A) and (B), the above-mentioned amount of movement X is determined by, for example, determining the voltage ratio of $V_A/V_B$ when the output of electromagnetic conversion device A 71 is taken to be $V_A$ and the output of electromagnetic conversion device B 72 is taken to be $V_B$. Although voltages in the form of $\alpha \times V_A$ and $\alpha \times V_B$ are obtained according to the change in the gap between, for example, electromagnetic conversion devices A 71 and electromagnetic conversion devices B 72 and each of magnetized portions 66 to be detected by them, there is the risk of arithmetic processing being performed as if movement had occurred despite there only having been a change in the size of this gap. Therefore, by performing processing in the form of $\alpha \times V_A / \alpha \times V_B$ in order to prevent this mechanical error, α is no longer related to the position data, thus allowing the amount of movement to be determined in the form of $V_A/V_B$.

Thus, since precise position data within one pitch (P) corresponding to $V_A/V_B$ is stored in advance in memory (ROM) 87, CPU 84 is able to determine distance α as shown in FIG. 10 by reading the value of $V_A/V_B$ determined by the above-mentioned arithmetic processing and the coinciding value from said memory (ROM) 87 and comparing those values. Since the position data of this determined distance α is stored in memory (RAM) 88, in which previously determined position data has already been stored (although not stored in memory at the point initially written from the above-mentioned reference position), CPU 84 adds said data to the most recently determined distance α after reading said data. As a result, computed distance X is written into memory (RAM) 88 in the form of position data.

By then repeating this arithmetic processing, the above-mentioned distance X is stored in the above-mentioned memory (RAM) 88 in the form of position data.

However, up-down counter 90, which counts the pulses applied by a control device not shown, is connected to CPU 84. This up-down counter 90 is composed to operate in response to reset commands of memory (RAM) 88. In addition, since the number of pulses generated for 1 pitch (P) shown in FIG. 10 is determined in advance, CPU 84 is able to compute distance X' by counting the number of pulses output from this up-down counter 90.

An amount of deviation is then determined by comparing this determined distance X' and distance X stored in the above-mentioned memory (RAM) 88. This determined amount of deviation is then output from D/A conversion circuit 92 by CPU 84. Table 38 is then driven to the proper position based on this output.

Furthermore, as is clear from FIG. 10, although the magnetized portions 66 to be detected by the above-mentioned electromagnetic conversion device A 71 and electromagnetic conversion device B 72 are formed without any gaps in between them in the present embodiment, pitch P between each magnetized portion 66 may be set larger by inserting a non-magnetized portion between these magnetized portions 66.

As was previously described, in said linear motion rolling guide unit, a magnetic scale having a detected portion consisting of a large number of magnetic poles in the lengthwise direction is employed as one example of the above-mentioned scale body 61, and detection of that detected portion is performed by using magnetic sensors in the form of electromagnetic conversion device A 71 and electromagnetic conversion device B 72 for the detecting portion. In addition to this magnetic type of position detection apparatus being inexpensive in comparison with the optical type of position detection apparatus described later as well as other types of position detection apparatuses, it also has good environmental resistance.

As one form of a large number of magnetized poles, differing magnetic N and S poles are alternately arranged and magnetized in the lengthwise direction of scale body 61. In this form of magnetization, magnetic flux is generated between adjacent magnetized portions 66. If the magnetic head (not shown) for magnetization is taken to be the stationary side, since this magnetizing method only requires that the polarity of said magnetic head simply switch between N and S while a scale material moves in the lengthwise direction with respect to said magnetic head, magnetization can be completed relatively easily, thus allowing manufacturing costs to be reduced.

In addition, in said linear motion rolling guide unit, magnetized portion 69 is formed as the origin in the above-mentioned detected portion, and serves as the reference of measurement by the above-mentioned detection head 47. A measurement reference signal is emitted as a result of magnetic resistance device 74, which contains said detection head 47, sensing this magnetized portion 69. As a result of employing this constitution, the size of the position detection apparatus, and ultimately the size of the overall linear motion rolling guide unit, can be reduced.

This being the case, as another method for obtaining a measurement reference signal, as shown, for example, with the imaginary lines in FIG. 10, a contact switch 94 and so forth equipped with mechanically operating actuator 94*a* may be provided at the location to serve as the measurement reference, and a moving portion in the form of slide unit 17 or table 38 directly engages with this actuator 94*a* to activate it. In this constitution, however, since said contact switch 94 is required, commercially available products are frequently used for said contact switch, and these are relatively large parts, this method is not advantageous for reducing the size of the position detection apparatus.

In the linear motion rolling guide as claimed in the present invention, since it is only necessary to form an origin at a detected portion as described above, and only provide a small part such as magnetic resistance device 74 for detecting this origin on the side of detection head 47, the size of the position detection apparatus can be reduced.

Figure 9:
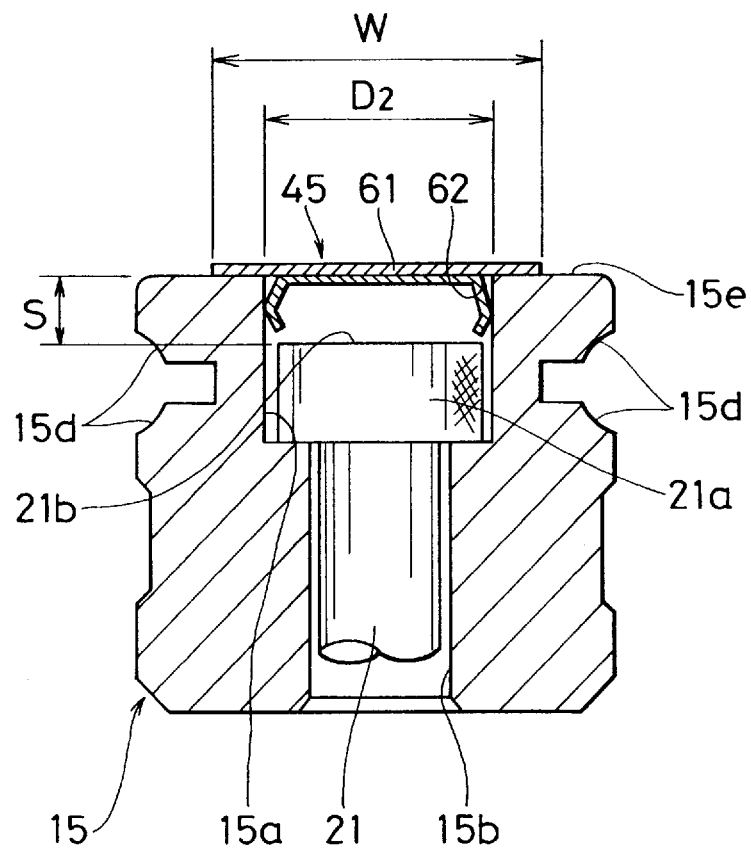
FIG. 9 is a view taken along arrows III—III relating to FIG. 8.
Figure 13:
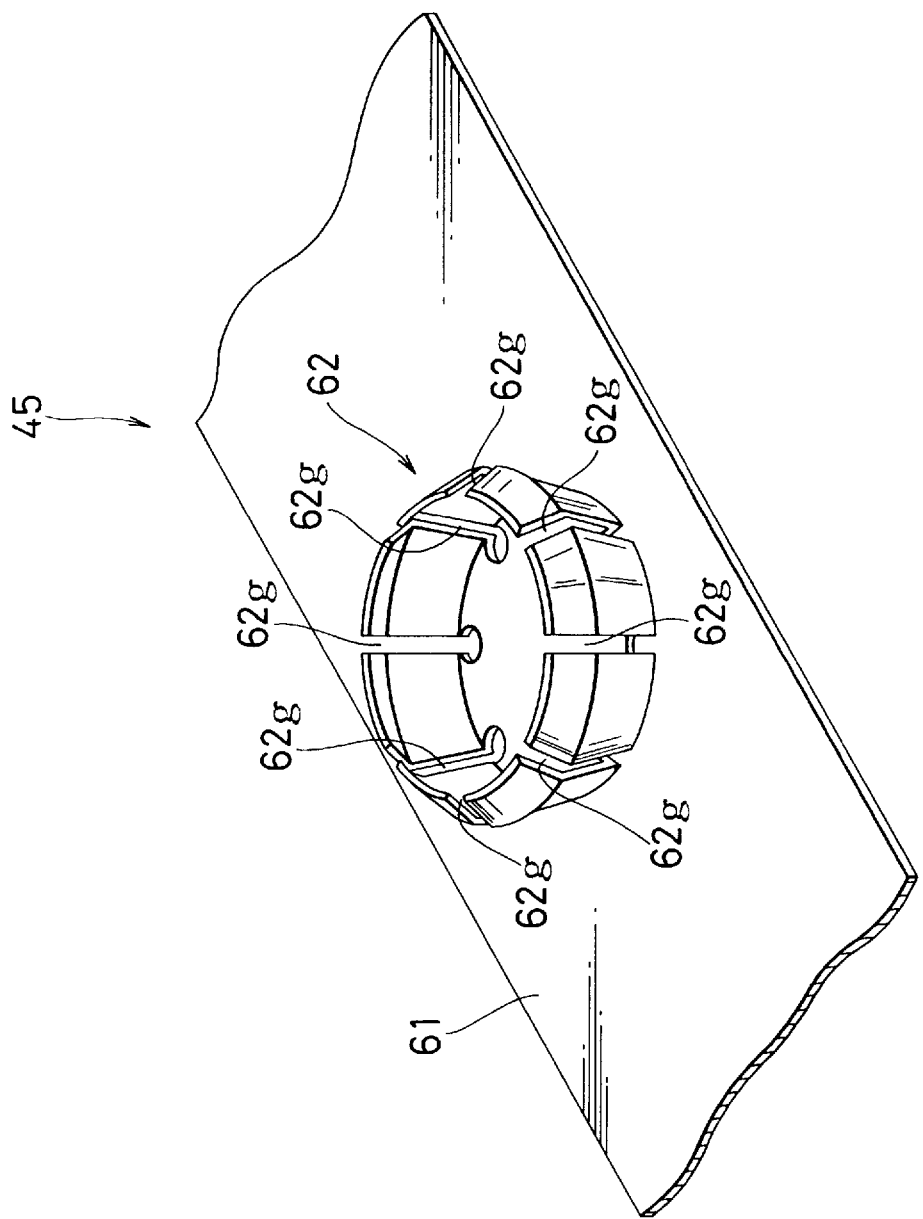
FIG. 13 is a perspective view of a portion of the scale equipped on the position detection apparatus shown in FIG. 10.
Figure 14A:
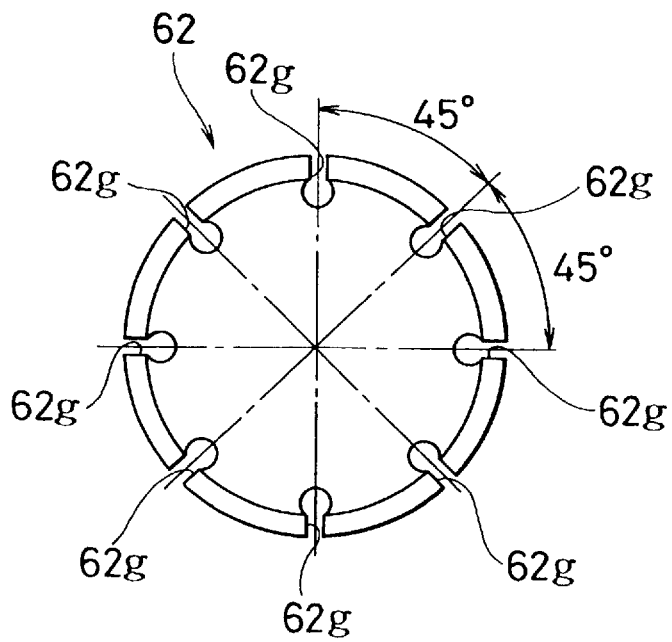
FIGS. 14(a), 14(b) and 14(c) are overhead, front and partial cross-sectional views, respectively, of the engaging portions that form a portion of the scale shown in FIG. 13.
Figure 14B:
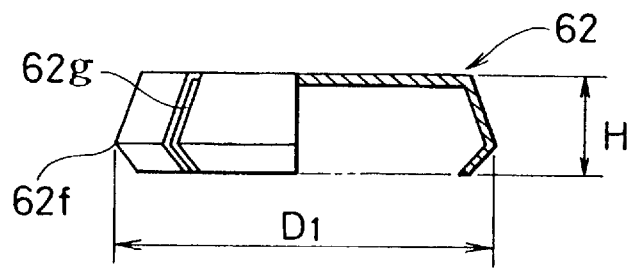
Figure 14C:
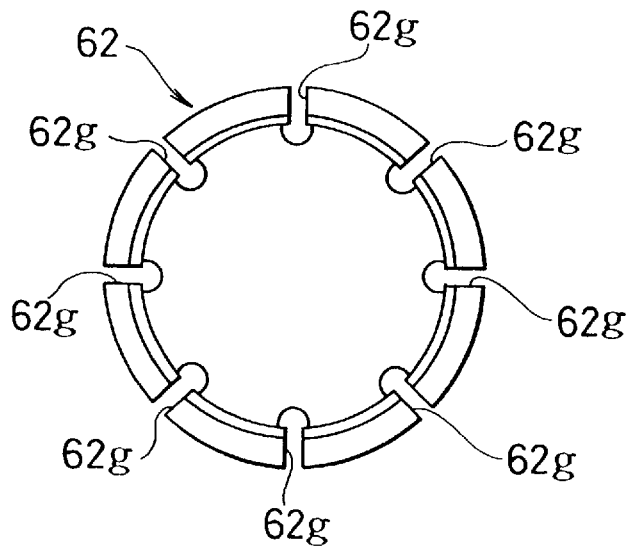

Continuing, an explanation is given regarding engaging portions 62, provided to attach scale body 61 of the above-mentioned constitution to track rail 15, based on FIGS. 9, 13 and 14.

FIGS. 14(*a*) through (*c*) are an overhead view, front view including a partial cross-section, and bottom view of the above-mentioned engaging portion 62, respectively. It can be seen from FIGS. 14(*a*)–14(*c*) and 13 that engaging portion 62 is roughly cylindrical with one closed end. Together with diameter gradually increasing from the closed end to the open end, it gradually narrows beyond a prescribed point 62*f* (see FIG. 14(*b*)), with outer diameter $D_1$ of said prescribed point 62*f* being larger than inner diameter $D_2$ (see FIG. 9) of (countersunk portions 15*a* that are a part of) the insertion holes of track rail 15. A plurality, in this case 8, of slits 62*g* that open towards the open end in parallel with the axial direction are arranged in said engaging portion 62 at an equal pitch (45°) in the circumferential direction. Engaging portion 62 of said shape can be easily manufactured by, for example, press forming using thin sheet steel, and together with having a low cost, enables resilient engaging force to be obtained easily with respect to the above-mentioned insertion holes.

Thus, although the above-mentioned engaging portion 62 has a larger diameter than the insertion holes of track rail 15, it can be resiliently deformed as desired due to the above-mentioned slits 62*g*, thus allowing it to fit into said insertion holes. Thus, the attachment of the above-mentioned scale body 61 to track rail 15 is relatively rigid, and is not separated even when subjected to a certain degree of vibration and impact.

As can be seen from FIG. 9, the above-mentioned engaging portion 62 is juxtapositioned between the top surface 21*b* of head 21*a* of bolt 21 inserted into countersunk portion 15*a* of the insertion holes of track rail 15, and the surface of said track rail 15, in this case the location of top surface 15*e*. Consequently, the height dimension H of said engaging portion 62 (see FIG. 14(*b*)) is set to be slightly smaller than distance S (see FIG. 9) between each top surface 21*b* and 15*e* of bolt 21 and track rail 15, respectively. Namely, since the space produced within said insertion holes in the state in which bolts 21 are inserted into the above-mentioned insertion holes is used as the space that contains the above-mentioned engaging portion 62, additional processing to enlarge the diameter, depth and so on of (countersunk portion 15*a* of) said insertion hole (as well as countersunk portion 15*a* therein) is unnecessary, thus not requiring any costs.

The above-mentioned engaging portion 62 is attached to scale body 61 by being separately formed from said scale body 61 in the form of a thin plate. More specifically, the closed end of engaging portion 62 is fastened to scale body 61 by welding such as spot welding or laser welding, or by using a relatively strong adhesive. According to this constitution, since scale body 61 and engaging portion 62 are coupled after forming them separately, although the number of manufacturing steps increases slightly, since each part has a simple shape and their forming is extremely simple, manufacturing can be performed with small-scale equipment.

Furthermore, although scale body 61 of scale 45 and engaging portion 62 are mutually coupled after being formed separately in the present embodiment, they may also be formed in the following manner.

Namely, scale body 61 of scale 45 and engaging portion 62 may be made from synthetic resin and formed into a single unit by a molding apparatus. In this constitution, since the scale can be manufactured all at once, the number of manufacturing steps is extremely few. However, after this integrated molding, it is necessary to form a magnetic film as previously described.

Furthermore, even in the case of forming from synthetic resin, it goes without saying that scale body 61 and engaging portion 62 may also be formed separately.

In addition, the shape of engaging portion 62 is not limited to that of the above-mentioned embodiment, but various shapes may naturally be considered according to the conditions of use and so forth.

As described above, in said linear motion rolling guide unit, scale body 61 is attached to track rail 15 by engaging engaging portions 62 into insertion holes formed for insertion of fastening members (bolts 21) into a track rail in the form of said track rail 15. In this manner, since a constitution is employed wherein attachment of scale 45 is performed by utilizing fastening member insertion holes of track rail 15, no processing is required whatsoever on track rail 15 for attaching a scale. In addition, the adhesive and bolts used for scale attachment in the prior art are also not required, thus reducing the number of processing steps and assembly steps to achieve a reduction in cost.

In addition, according to the above-mentioned constitution, the state in which scale 45 is fixed to track rail 15 is maintained semi-permanently as long as the resilient fitting state of engaging portions 62 in the above-mentioned insertion holes is maintained.

Moreover, according to the above-mentioned constitution, in the case it becomes necessary to replace scale 45 already attached to track rail 15 as a result of being damaged for some reason, scale body 61 can be easily separated from track rail 15 by pulling up scale body 61 so that the above-mentioned engaging portions 62 are extracted from the insertion holes of track rail 15. When attaching a new scale, attachment can be completed simply by conversely inserting engaging portions 62 into the above-mentioned insertion holes. Thus, scale replacement, namely scale attachment and removal, can be performed easily and quickly.

In addition, since the above-mentioned scale 45 can be attached to track rail 15 as described above without requiring any special processing and so forth on said track rail 15, scale 45 alone can be later removed and attached to other various types of track rails already installed on a machine tool and so forth.

Moreover, the above-mentioned scale 45 also functions as a so-called top cover that covers the fastening member insertion holes (countersunk portions 15a and holes 15b) of track rail 15, thus improving the dust resistance of said linear motion rolling guide unit.

Furthermore, although sensor unit 19 is provided separately from slide unit 17, and detection head 47 is provided on said sensor unit 19, this sensor unit 19 may be omitted, and detection head 47 may be attached to slide unit 17 or table 38. One specific example of this is that in which detection head 47 is attached to the end of end cap 25a or 25b of slide unit 17. In this case, in addition to a constitution wherein said detection head 47 is attached to said slide unit 17 or table 38 using adhesive, screws and so forth, it may also be attached to a separate magnetic stand (not shown) after which said magnetic stand is attached to said slide unit 17 or table 38.

If detection head 47 is to be attached to the above-mentioned slide unit 17, the number of parts mechanically juxtapositioned between scale 45 and said detection head 47 is minimized, the cumulative value of the manufacturing error of each part and the assembly error between parts is held to a low level, thus enabling the relative position of detection head 47 and scale 45 to be set with high precision.

Continuing, the following provides an explanation of a scale as an essential portion of a linear motion rolling guide unit as a second embodiment of the present invention based on FIGS. 15 and 16(a)–16(c).

Since, the linear motion rolling guide unit of this second embodiment is composed in a similar manner to the linear motion rolling guide unit of the first embodiment shown in FIGS. 2 through 14 with the exception of the scale explained below, an explanation of the entire unit will be omitted to avoid repetition.

In addition, in the following explanation, the same reference numerals will be used for those constituents that are identical to constituents of the linear motion rolling guide unit of said first embodiment.

In addition, explanations of said portions will be similarly omitted in other embodiments to follow, and explanations will only focus on essential portions.

Figure 15:
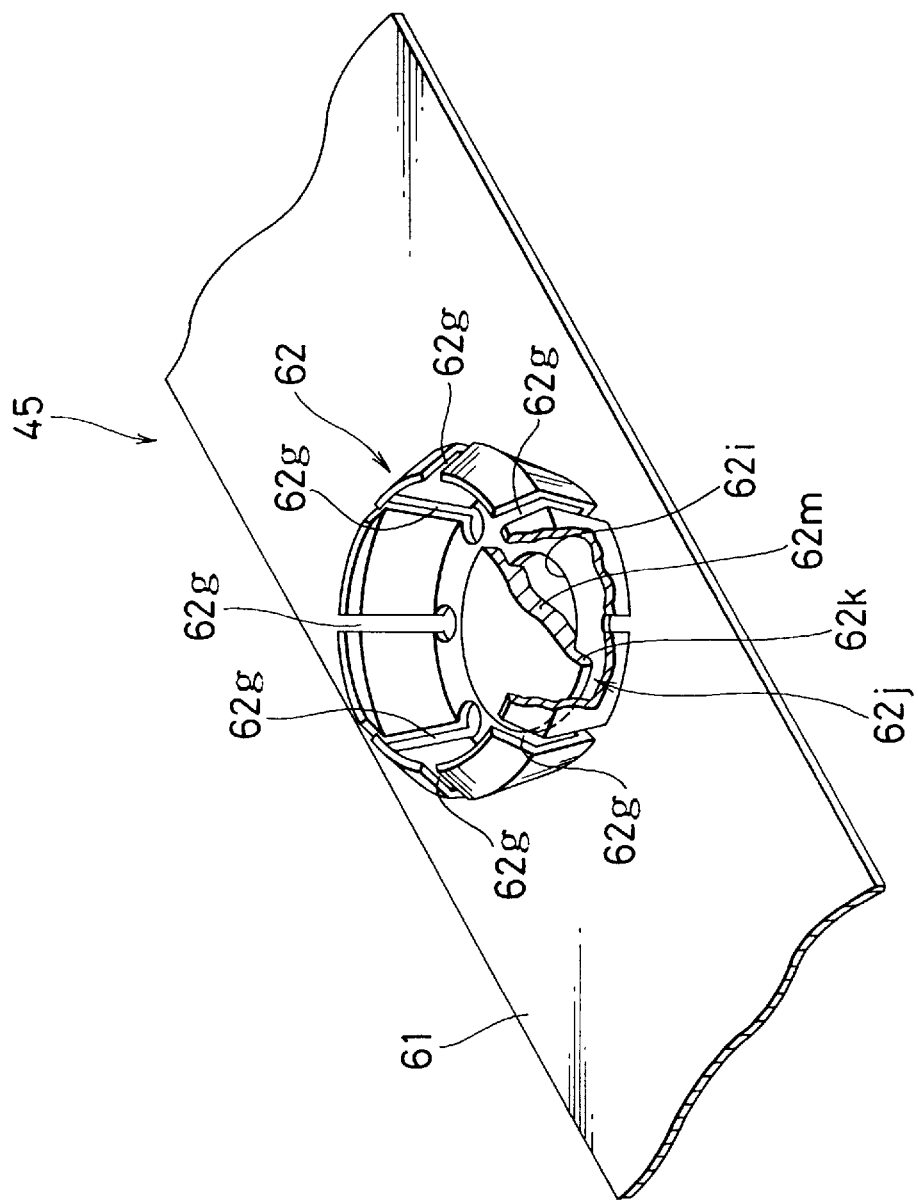
FIG. 15 is a perspective view, including a partial cross-section, of a portion of the scale that is an essential portion of a linear motion rolling guide unit as a second embodiment of the present invention.
Figure 16A:
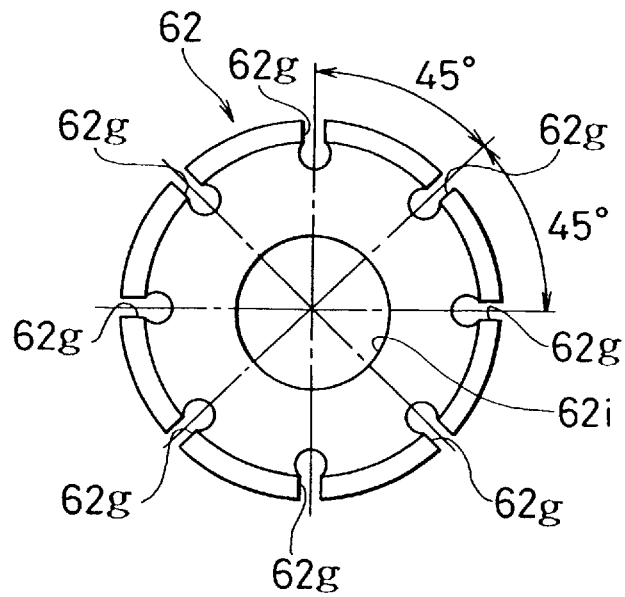
FIGS. 16(a), 16(b) and 16(c) are overhead, longitudinal cross-sectional and bottom views, respectively, of the engaging portions that form a portion of the scale shown in FIG. 15.
Figure 16B:
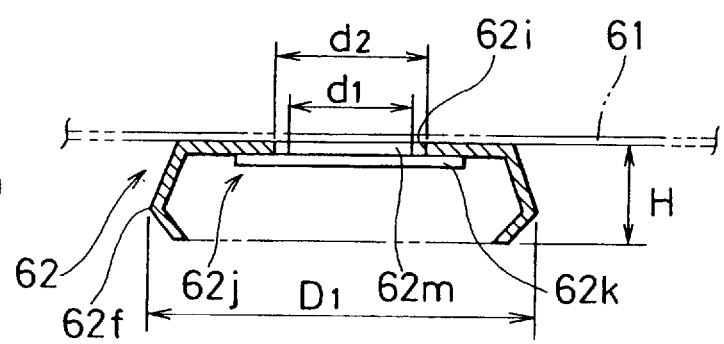
Figure 16C:
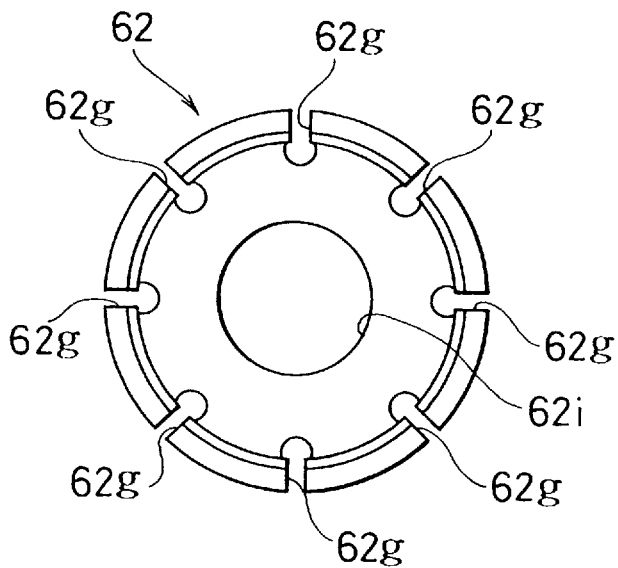

FIG. 15 shows the state of said scale 45 as viewed from a single engaging portion 62. In addition, FIGS. 16(a) through (c) are an overhead view, longitudinal cross-sectional view and bottom view of engaging portion 62 equipped on said scale 45, respectively. It can be seen from these drawings that hole 62i, for example a circular hole, is formed in the closed end of engaging portion 62. As shown in FIGS. 15 and 16(b), engaging portion 62 is attached to scale body 61 by circular rivet 62j inserted into said hole 62i.

The above-mentioned rivet 62j has a large diameter portion 62k and small diameter portion 62m, and said small diameter portion 62m is inserted into the above-mentioned hole 62i to support engaging portion 62 with large diameter portion 62k. As shown in FIG. 16(b), diameter $d_1$ of said small diameter portion 62m is set to be smaller than inner diameter $d_2$ of hole 62i into which it is inserted. As a result, the above-mentioned engaging portion 62 is able to move slightly $(d_2-d_1)$ in the lengthwise direction and direction of width of scale body 61. However, it may also be made to only move in either said lengthwise direction or direction of width as necessary. Since engaging portion 62 is able to move with respect to scale body 61 in this manner, even in the case a relatively large error occurs in the pitch and so forth between insertion holes (countersunk portions 15a and holes 15b) arranged in a row in track rail 15 (see FIGS. 2 through 9), each engaging portion 62 can be fit so as to adjust to each insertion hole by the above-mentioned mobility of each engaging portion, thus preventing the occurrence of defective fitting.

Figure 17:
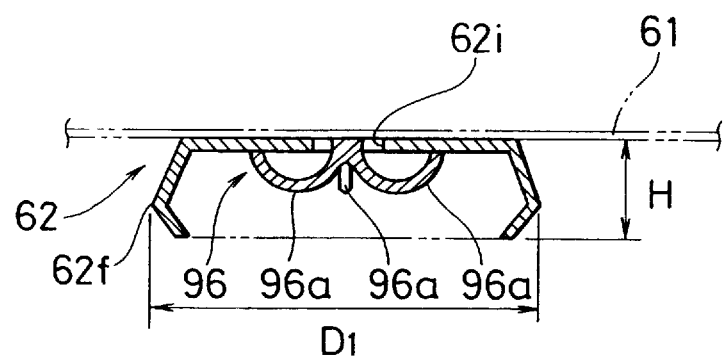
FIG. 17 is a longitudinal cross-sectional view showing a variation of the engaging portions shown in FIG. 16.

A rivet for attaching the above-mentioned engaging portion 62 to scale body 61 while allowing slight mobility is not limited to that of the above-mentioned constitution, but rather various other forms can also be applied. Rivet 96 shown in FIG. 17 is a specific example of another type of rivet. This rivet 96 has, for example, four flexible portions 96a equally spaced from each other and formed by bending into the shape of arcs. Rivet 96 supports engaging portion 62 by means of the resiliency of each of said flexible portions 96a.

Furthermore, each of the types of rivets described above is formed by mounting one end to the above-mentioned scale body 61 by welding or other means, while at the same time performing hot forming or cold forming to form into the required shape.

Figure 18:
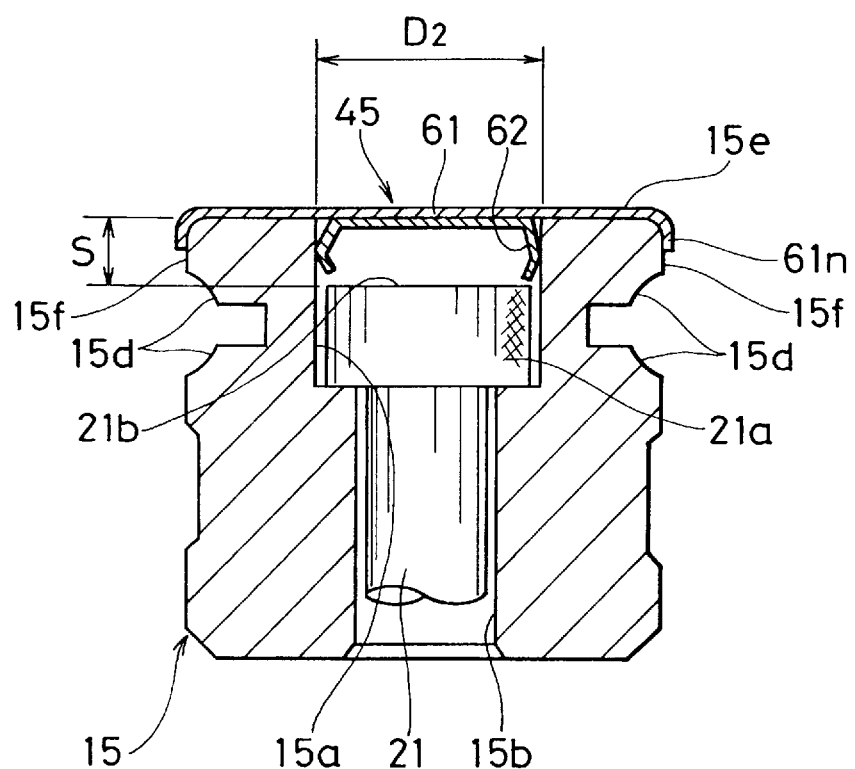
FIG. 18 is a longitudinal cross-sectional view perpendicular to the lengthwise direction of the track rail and scale that are essential portions of a linear motion rolling guide unit as a third embodiment of the present invention.

Next, the following provides an explanation of the essential portion of a linear motion rolling guide unit as a third embodiment of the present invention while referring to FIG. 18.

As shown in the drawing, in the present embodiment, scale body 61 of scale 45 has bent extending portion 61n which extends from both sides of top surface 15e of track rail 15 to the upper portion of side surfaces 15f. This bent extending portion 61n is formed over the entire length of said scale body 61. As a result of providing this bent extending portion 61n, the entrance of dust and so forth from both sides of scale body 61 is prevented, thereby improving dustproofing effects.

Figure 19:
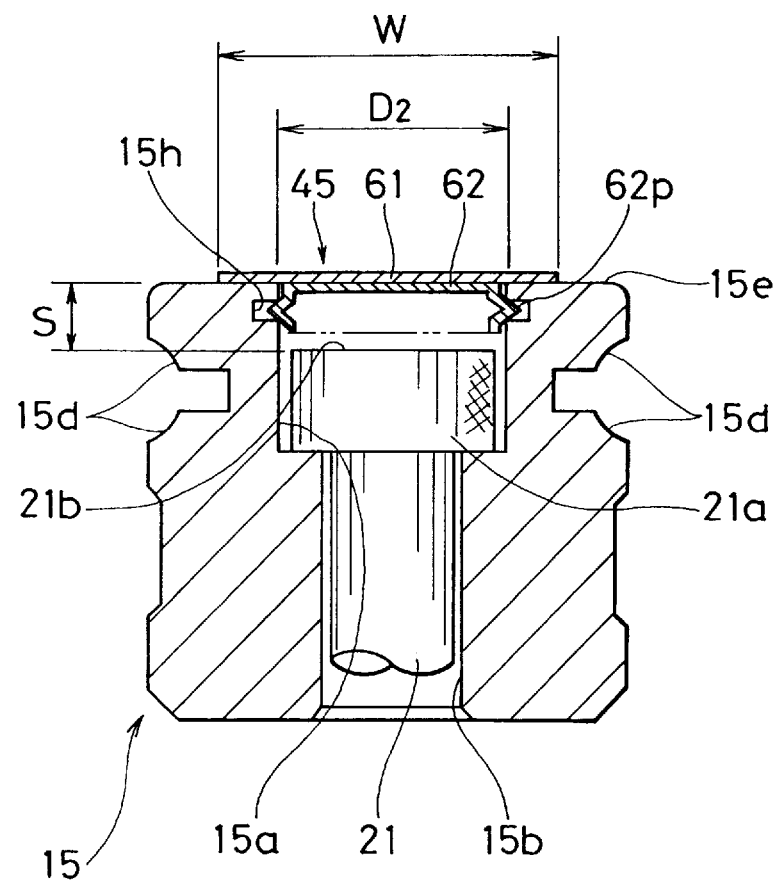
FIG. 19 is a longitudinal cross-sectional view perpendicular to the lengthwise direction of the track rail and scale that are essential portions of a linear motion rolling guide unit as a fourth embodiment of the present invention.

Next, the following provides an explanation of the essential portion of a linear motion rolling guide unit as a fourth embodiment of the present invention based on FIG. 19.

As shown in the drawing, in the present embodiment, ring-shaped indentation 15h that locks engaging portion 62 is formed in the inner surface of countersunk portion 15a that is a portion of an insertion hole formed in track rail 15 into which bolt 21 is inserted. Projection 62p that fits into this indentation 15h is formed on engaging portion 62. In this constitution, attachment of scale 45 to track rail 15 becomes more rigid, resulting in excellent vibration resistance, impact resistance and so forth.

Figure 20:
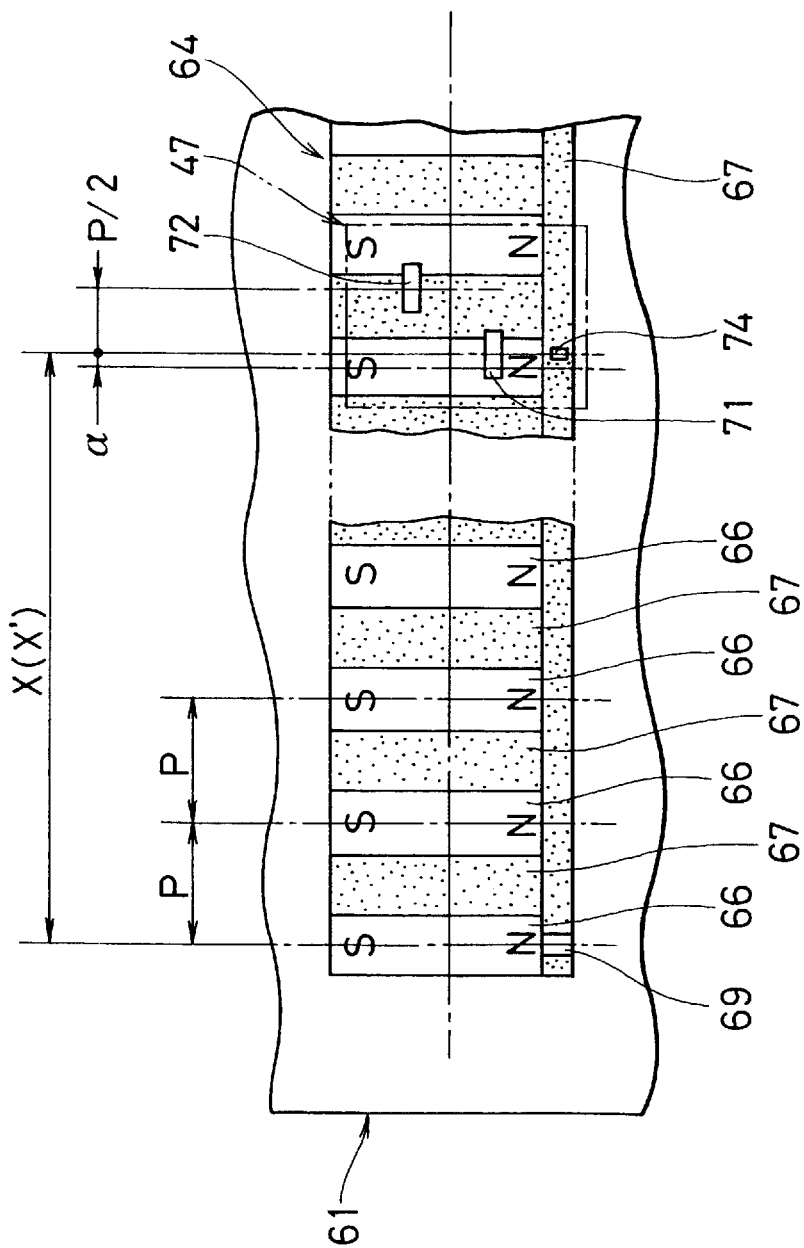
FIG. 20 is an overhead view showing a portion of a position detection apparatus that is an essential portion of a linear motion rolling guide unit as a fifth embodiment of the present invention.

FIG. 20 shows a scale and detection head 47 that are essential portions of a linear motion rolling guide unit as a fifth embodiment of the present invention.

As shown in the drawing, in said scale, each magnetized portion 66 formed for position detection on scale body 61 equipped on said scale is arranged in a row with non-magnetized portions 67 located in between.

Furthermore, in this case, the dimensions of each magnetized portion 66 and each non-magnetized portion 67 in the lengthwise direction of said scale body 61 are set to be mutually equal. One side of each magnetized portion 66 in the direction perpendicular to said lengthwise direction is magnetized with an N pole, while the other side is magnetized with an S pole.

In said constitution, magnetic flux is produced between the N and S poles of each magnetized portion 66. The density of this magnetic flux reaches a maximum at the center of each magnetized portion in the lengthwise direction of the scale, extends to the range of the adjacent non-magnetized portion 67 while gradually weakening, and then reaches a minimum at the center of said non-magnetized portion 67. Accordingly, the waveforms obtained from each electromagnetic conversion device A 71 and electromagnetic conversion device B 72 of detection head 47 are still in the form of continuous positive and negative sine waves.

In the case of this magnetization method, if the magnetic head for magnetization equipped on the magnetizing apparatus is taken to be the stationary side, since it is only required that said magnetic head be switched on and off while the scale material is moved in the lengthwise direction with respect to said magnetic head, magnetization can be performed more easily, thus enabling costs to be reduced.

Furthermore, in this magnetization method, devices having various resolutions can be fabricated easily and at low cost.

Namely, the period of the resulting sine waves can be changed by suitably altering the distance between each magnetized portion 66, namely the range of formation of non-magnetized portions 67, thus enabling resolution to be set as desired. In the previously described magnetization method as well, namely the method wherein differing N and S magnetic poles are alternately arranged and magnetized in the lengthwise direction of the scale as shown in FIG. 10, resolution can be changed as desired by providing non-magnetized portions between each magnetized portion 66 and suitably setting the size of those non-magnetized portions.

Figure 21:
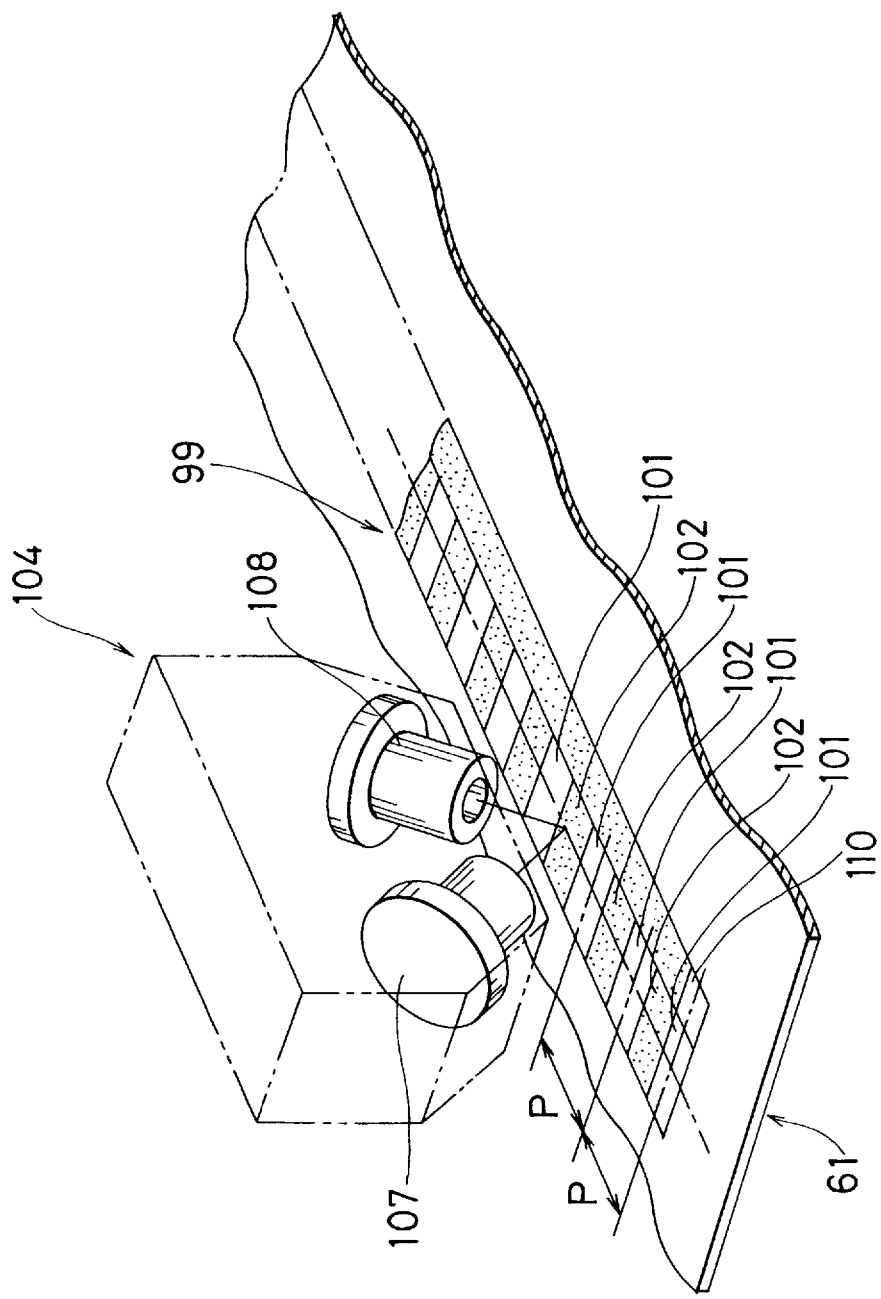
FIG. 21 is a perspective view showing a portion of a position detection apparatus that is an essential portion of a linear motion rolling guide unit as a sixth embodiment of the present invention.

Next, the following provides an explanation of a position detection apparatus that is an essential portion of a linear motion rolling guide unit as a sixth embodiment of the present invention based on FIG. 21.

Although position detection apparatuses are composed of a magnetic scale and magnetic sensor in each of the previously described embodiments, in the present embodiment, the position detection apparatus is composed in the following manner.

First, detected portion 99 formed on scale body 61 is composed as described below.

As shown in the drawing, said detected portion 99 has first reflecting portions 101 and second reflecting portions 102, which have mutually different light reflection coefficients, alternately arranged in the lengthwise direction of said scale body 61. In this case, the light reflection coefficient of first reflecting portions 101 is greater than that of second reflecting portions 102.

On the other hand, the detection head that detects the detected portion of the above-mentioned constitution is photoreflector 104. Said photoreflector 104 has light emitting device 107, which radiates light towards the above-mentioned first reflecting portions 101 and second reflecting portions 102, and light receiving device 108, which receives reflected light from each of said reflecting portions and emits a signal based on said reflected light.

In a position detection apparatus of said constitution, as a result of moving the movable side in the form of slide unit 17 and table 38 (see FIGS. 2 and 3), a signal based on light reflected from the above-mentioned first reflecting portions 101 and second reflecting portions 102 is emitted from light receiving device 108. For example, the amount of movement of the table can be determined by counting the signals obtained based on light reflected from the above-mentioned first reflecting portions 101 by a counter equipped on a controller. Namely, as shown in FIG. 21, after setting arrangement pitch P of corresponding first reflecting portions 101, said count value should then be multiplied by that pitch P. However, as shown in FIG. 21, an origin in the form of third reflecting portion 110 is provided to serve as the measurement reference corresponding to the first reflecting portion 101 located on the end. Above counting is then performed using the signal which is obtained based on light reflected from said third reflecting portion 110 using another photoreflector not shown as the measurement reference.

In the position detection apparatus shown in FIG. 21, although the apparatus is not able to determine the direction of movement, it is easy to allow this apparatus to also determine direction of movement.

The optical type of position detection apparatus described above is small in size, and since photoreflector 104 in particular is the smallest in size for the detecting portion, it is easy to reduce the overall size of the linear motion rolling guide unit. In addition, an optical type of position detection apparatus is not susceptible to magnetic effects.

Furthermore, although balls 34 circulate within slide unit 17 accompanying sliding of said slide unit 17 in each of the above-mentioned embodiments, the present invention is not limited to said constitution, but naturally may also be applied to guide units having other constitutions. In addition, although balls are used for the rolling elements in each of the above-mentioned embodiments, a constitution may also be employed in which rollers are used.

Moreover, although each of the above-mentioned embodiments indicates a linear motion rolling guide unit that operates linearly as a rolling guide unit, it is naturally also possible to apply the present invention to a curved type in which the track rail and so forth is curved.

In addition, the present invention is not limited to the constitutions of each of the embodiments previously described, but a portion of each may be suitably mutually combined or mutually applied enabling the realization of a diverse range of constitutions.

As has been explained above, according to the present invention, a scale body is attached to a track rail by engaging engaging portions with insertion holes formed for insertion of fastening members in a track rail. In this manner, since a constitution is employed wherein attachment of the scale is performed by using fastening member insertion holes of the track rail, processing for attaching a scale is not required at all on the track rail. In addition, adhesive or bolts for attaching the scale are also not required, thus reducing the number of processing steps and assembly steps to achieve a reduction in costs.

In addition, according to the above-mentioned constitution, the attachment of the scale to the track rail is maintained semi-permanently as long as the resilient fitting of the engaging portions to the above-mentioned insertion holes is maintained.

Moreover, according to the above-mentioned constitution, in the event it becomes necessary to replace a scale that is already attached to a track rail as a result of being damaged and so forth, the scale can be easily separated from the track rail by pulling up the scale body so that the above-mentioned engaging portions are extracted from the insertion holes of the track rail. When attaching a new scale, attachment is completed simply by conversely inserting the engaging portions into the above-mentioned insertion holes. Thus, scale replacement, namely attachment and removal, can be performed both easily and quickly.

In addition, since the scale as claimed in the present invention can be attached without requiring any special processing of the track rail as described above, only the scale can be attached to various other types of track rails that are already installed on a machine tool and so forth.

Moreover, the above-mentioned scale also functions as a so-called top cover that covers the fastening member insertion holes of the track rail thereby improving the dust resistance of the guide unit.

What is claimed is:

1. A position detection apparatus equipped with a scale and a detection head; wherein, said scale comprises a scale body in the form of a thin plate that extends along the lengthwise direction of a track rail, and engaging portions having resilience that attach to a lower surface of said scale body and engage insertion holes formed in said track rail into which fastening members are inserted for fixing said track rail to a bed.

2. A position detection apparatus as set forth in claim 1 wherein said engaging portions have a diameter larger than said insertion holes, and are fit into said insertion holes by resilient deformation.

3. A position detection apparatus as set forth in claim 1 wherein said engaging portions are roughly cylindrical with one closed end, and have a diameter that gradually increases from the closed end towards an open end of the engaging portions up to a prescribed point, the diameter gradually decreasing beyond the prescribed point, an outer diameter of said engaging portions at said prescribed point being larger than an inner diameter of said insertion holes, and said engaging portions each having a plurality of slits that open towards said open end and extend substantially in parallel with an axial direction of said engaging portions and are arranged in a row in a circumferential direction of said engaging portions.

4. A position detection apparatus as set forth in claim 1 wherein said engaging portions are juxtapositioned between a top surface of heads of said fastening members inserted into countersunk portions of said insertion holes and the lower surface of said track rail.

5. A position detection apparatus as set forth in claim 1 wherein said scale body is a magnetic scale made of an iron-based ferromagnetic material.

6. A track rail unit having a track rail in which tracks are formed in the lengthwise direction and a position detection apparatus equipped with a scale and a detection head; wherein, said scale comprises a scale body in the form of a thin plate that extends along the lengthwise direction of a track rail, and engaging portions having resilience that attach to a lower surface of said scale body and engage insertion holes formed in said track rail into which fastening members are inserted for fixing said track rail to a bed.

7. A guide unit having a track rail in which tracks are formed along the lengthwise direction, a slider able to move relative to said track rail, and a position detection apparatus equipped with a scale and a detection head that detects the relative position of said track rail and said slider; wherein, said scale comprises a scale body in the form of a thin plate that extends along the lengthwise direction of a track rail, and engaging portions having resilience that attach to a lower surface of said scale body and engage insertion holes formed in said track rail into which fastening members are inserted for fixing said track rail to a bed.

8. A guide unit as set forth in claim 7 wherein said detection head is attached to said slider.

* * * * *